United States Patent [19]

Petcen

[11] Patent Number: 4,495,015
[45] Date of Patent: Jan. 22, 1985

[54] CONTROLLED WAFER RELAXING IN MAKING COMPOSITE LENSES

[75] Inventor: Donald H. Petcen, Colonial Heights, Va.

[73] Assignee: Coburn Optical Industries, Inc., Muskogee, Okla.

[21] Appl. No.: 528,675

[22] Filed: Sep. 1, 1983

[51] Int. Cl.³ .............................................. B32B 17/10
[52] U.S. Cl. .......................................... 156/80; 65/37; 156/99; 156/106; 264/1.1; 264/1.7; 351/159; 351/166; 351/177
[58] Field of Search ........................... 156/80, 99, 106; 264/1.1, 1.7, 2.6, 2.7, 28; 65/37, 38; 351/166, 177, 159

[56] References Cited

U.S. PATENT DOCUMENTS 2,408,540 10/1946 Williams .............................. 264/1.7
3,801,397 4/1974 Casserley .............................. 156/99
4,103,070 7/1978 Ammons .............................. 428/412
4,364,786 12/1982 Smith et al. .......................... 156/99

FOREIGN PATENT DOCUMENTS 1576394 10/1980 United Kingdom .
804589 2/1981 U.S.S.R. .

Primary Examiner—Caleb Weston

[57] ABSTRACT

Disclosed, in a method for preparing a preformed thermoplastic/thermoset wafer for lamination to a prefinished ophthalmic lens, the improvement comprising: storing the preformed thermoplastic/thermoset wafer immediately after manufacture under refrigerating conditions; and subjecting said stored wafer to a temperature of 90° to 120° F. at 50% to 70% RH for no more than 48 hours just prior to lamination of same to an ophthalmic lens.

8 Claims, No Drawings

CONTROLLED WAFER RELAXING IN MAKING COMPOSITE LENSES

This invention relates to a process of controlled relaxing of thermoset/thermoplastic wafers used in composite lenses.

Opthalmic and sunglass lenses have been used for many years. The optical industry has faced difficult problems in the manufacturing, handling and packaging of the optical glass materials. Such glasses are sensitive to mechanical stress, scratch easily and require the utmost care in handling to insure that a safe precision product is provided to the user. More recently the problems associated with manufacturing, handling and packaging of ophthalmic lenses became more difficult because of the use of composite materials for ophthalmic applications, namely, glass-plastic laminates. Generally, such composites are made of at least two materials: an inorganic glass lens prefinished by grinding and polishing to prescription on both of its major surfaces, and a composite organic material in the form of a thin film bonded to the glass lens and forming therewith the "uncut" form of the ophthalmic lens. If desired, the uncut lens is then tinted to various colors to provide luminous transmission characteristics thereto. For mounting, the completed lens is edge finished and installed in frames by conventional methods. The process for making such composite lenses generally includes the cleaning, drying and inspection of the inorganic glass surface, the positioning of the organic film material onto the glass lens, the lamination or bonding of the two components, dying or tinting the composite, and "fixing" the dye thereto.

One facet of composite lens manufacturing involves the chemical and physical lamination of the thermoset plastic wafer to the prefinished glass lens accomplished under suitable conditions of heat and pressure. The prior art has encountered various problems with such lamination as will be summerized herein.

Thermoset plastics, such as thermoset polyurethanes, when bonded directly to glass without the use of an adhesive exhibit excellent initial adhesion but tend to delaminate when exposed to moisture on extended use. When the thermoset wafer is adhered to the glass by use of an adhesive in liquid solution, it is cumbersome to remove the solvents from between the plastic/glass laminate. The use of adhesives containing no solvent, although solves the problem of removal, is also not without complication: it is difficult to form an adhesive coating of uniform thickness especially on a curved surface. Such non-uniformity results in optical defects, such as distortions, which render the glass/plastic laminate unacceptable of ophthalmic purposes.

To correct these problems, it has been proposed to utilize a preformed sheet or wafer for use in a glass/plastic laminate, the surface layer at one side of which is of a thermoplastic material, and the surface layer at the other side of which is of a thermoset material. Such thermoplastic/thermoset film is then repositioned onto the prefinished ophthalmic glass layer by its thermoplastic surface and after being subjected to the required compressive pressure, the glass/plastic layers are bonded together in an autoclave under appropriate temperature/pressure and humidity conditions.

While the above process improves the optical quality of composite lenses producedthereby, it does not provide a solution for the problems of optical distortions resulting from the changes in physical properties of the thermoplastic/thermoset wafers under varying temperature and relative humidity conditions encountered during manufacturing. To wit: The plastic wafer having a thickness of less than 1 mm is composed of two layers, a thermoset polyurethane layer and a thermoplastic layer. After manufacturing, the wafers must be stored under refrigerating conditions of 40° to 50° F. to prevent changes in adhesive properties as well as optical aberrations due to disturbances in the adhesive layer from heat and pressure. It was found, however, that the wafer stored under refrigerating conditions when laminated to the glass neither possess the required adhesive quantities nor is it free from stress and optical aberrations after the completion of the lamination process. As a result, large number of "rejects" were produced which necessitated to subject the refrigerated wafers to ambient temperatures for long time periods prior to lamination which often extended to 3 weeks or more. However, even after such extended "relaxation" period, this treatment often proved ineffective. In addition, during the extended relaxation period the adhesive qualities of the wafer were adversely affected, again resulting in rejects.

It is, therefore, an object of the present invention to provide an improved technique for laminating a thermoset/thermoplastic wafer to an ophthalmic lens.

It is a further object of the invention to provide a technique that provides for consistency in the physical properties of the wafers used in such lamination.

It is still another object of the present invention to reduce to a minimum the long time period required for relaxing refrigerated wafers used for lamination with an ophthalmic lens.

SUMMARY OF THE INVENTION

In accordance with the present invention, there is provided a method for preparing a preformed thermoplastic/thermoset wafer for lamination to a pre-ground, pre-finished ophthalmic lens which comprises:

(a) storing said preformed thermoplastic/thermoset wafer immediately after manufacture at a temperature of about 40° to 50° F. at less than 50% relative humidity; and (b) subjecting said stored wafer to a temperature of about 90° to 120° F. at 50% to 70% relative humidity for not more than about 48 hours just prior to laminating said wafer to an ophthalmic lens.

The composite lenses produced according to a process, which included the improved process steps herein described, resulted in a 10% reduction of rejects due to failure of adhesive and optical properties.

DETAILED DESCRIPTION OF THE INVENTION

The wafer used in the present invention is cut from a film made according to techniques known in the art. The film comprises: a thermoset polymeric material, such as a crosslinked thermoset polyurethane; and a thermoplastic material, such as an amorphous thermoplastic polyurethane, having adhesive properties upon being subjected to elevated temperatures, joined with said thermoset polymer material by surface adhesion or chemical bonding. The total thickness formed by the film layers amount to less than 1 mm wherein the thickness of the thermosetting material constitute the major portion of the total thickness of the combined layers.

The thermoset polymers having a molecular weight of about 2000–10,000 may be made from well-known monomers according to standard synthetic procedures. For example, in preparing thermoset polyurethanes, monomers, such as 1,6-hexa-nediisocyanate, 1, 2, 3-propane triol, ethylene oxide, 1, 2-propylene oxide and the like may be used.

The thermoplastic polymer is preferably a polyurethane having a molecular weight of about 1,000 to 20,000 in which the monomers react to form linear chains, such as malonic acid, succinic acid, diethylene glycol, polyethylene glycol, polypropylene glycol and the like.

After its manufacture the thermoset/thermoplastic film is cut into wafers having a diameter corresponding to the diameter of the glass lens blanks, and the wafers are packed into round containers in which the individual wafers are separated by a thin non-adherent film. This non-adherent film both protects the wafers from particles of dust and dirt and also prevents adhesion of wafers to each other. The containers are then placed into refrigerators and stored at a temperature of about 40° to 50° F. at less than 50% RH. The storage under these conditions preserve the qualities of the wafers and may be extended to several weeks until such a time when the wafers are needed for lamination to the pre-finished lenses.

Prior to laminating the wafers to glass lenses, the wafers must be "relaxed". It has been found that a temperature of 90° to 120° F., preferably 100° to 110° F. and a relative humidity of 50% to 70%, and preferably 55% to 65% maintained for 15–48 hrs., and preferably for 20–24 hrs., provide the necessary conditions for such relaxation. These conditions insure consistency in the physical/chemical characteristics of the wafers and upon their lamination to glass lenses no stress, shrinkage or optical aberration was observed. Over or under relaxing the wafers on the other hand resulted in undesired optical aberrations and rejects.

Following the relaxation period the wafers are laminated to glass lenses and bonded in an autoclave. Next, the finished product is inspected to insure that various standards are met. Compliance with ophthalmic standards is assured through visual and instrumental examination commonly used in the industry. Among other testing methods, the laminate is viewed against a black background in fluorescent light to reveal the presence of inclusions and surface defects, such as pits and scratches, which may be present in the glass, the wafer or at their interface. The inspection also includes checking for haze in the form of microscopic bubbles indicative of incorrect lamination and bonding.

Following these steps the laminates are subjected to ombroscopic examination, i.e. shadowgraph in high intensity monochromatic light to reveal distortions in the laminates caused by the incorrect application of the wafer to the glass.

What is claimed is:

1. In a method of laminating a preformed thermoplastic/thermoset wafer to a pre-finished ophthalmic glass lens of the type, wherein after manufacturing, the preformed thermoplastic/thermoset wafer is positioned against the surface of the pre-finished ophthalmic glass lens so that the thermoplastic side thereof is in contact with said glass surface, said wafer and glass are pressed to form a laminate and subjected to elevated temperatures and high pressures to strengthen bonding therebetween, wherein the improvement comprises:

storing said preformed thermoplastic/thermoset wafer immediately after manufacture thereof at a temperature of about 40° to 50° F. at less thant 50% relative humidity; and subjecting said stored wafer to a temperature of about 90° to 120° F. and a relative humidity of about 50% to 70% for 15 to 48 hours just prior to said lamination.

2. The method of claim 1 wherein said wafer is subjected to about 100° to 110° F. and a relative humidity of 55% to 65% for 15 to 48 hours prior to said lamination.

3. The method of claim 1 wherein said wafer is subjected to about 100° to 110° F. and a relative humidity of 55% to 65% for 20–24 hours prior to said lamination.

4. The method of claim 1 wherein said wafer comprises: a crosslinked thermoset polyurethane layer and an amorphous thermoplastic polyurethane layer.

5. The method of claim 4 wherein the thickness of said wafer is less than 1 mm.

6. The method of claim 4 wherein the thickness of the thermosetting layer constitute the major portion of the total thickness of the wafer.

7. The method of claim 4 wherein said thermoset polymers have a molecular weight of 2,000 to 10,000.

8. The method of claim 4 wherein said thermoplastic polymers have a molecular weight of 1,000 to 20,000.

* * * * *